Oct. 16, 1956     W. C. KANZ     2,766,683
GRIDDLE

Filed May 17, 1954     5 Sheets-Sheet 1

INVENTOR.
Wm. C. Kanz
BY
Chas. H. Trotter
Atty.

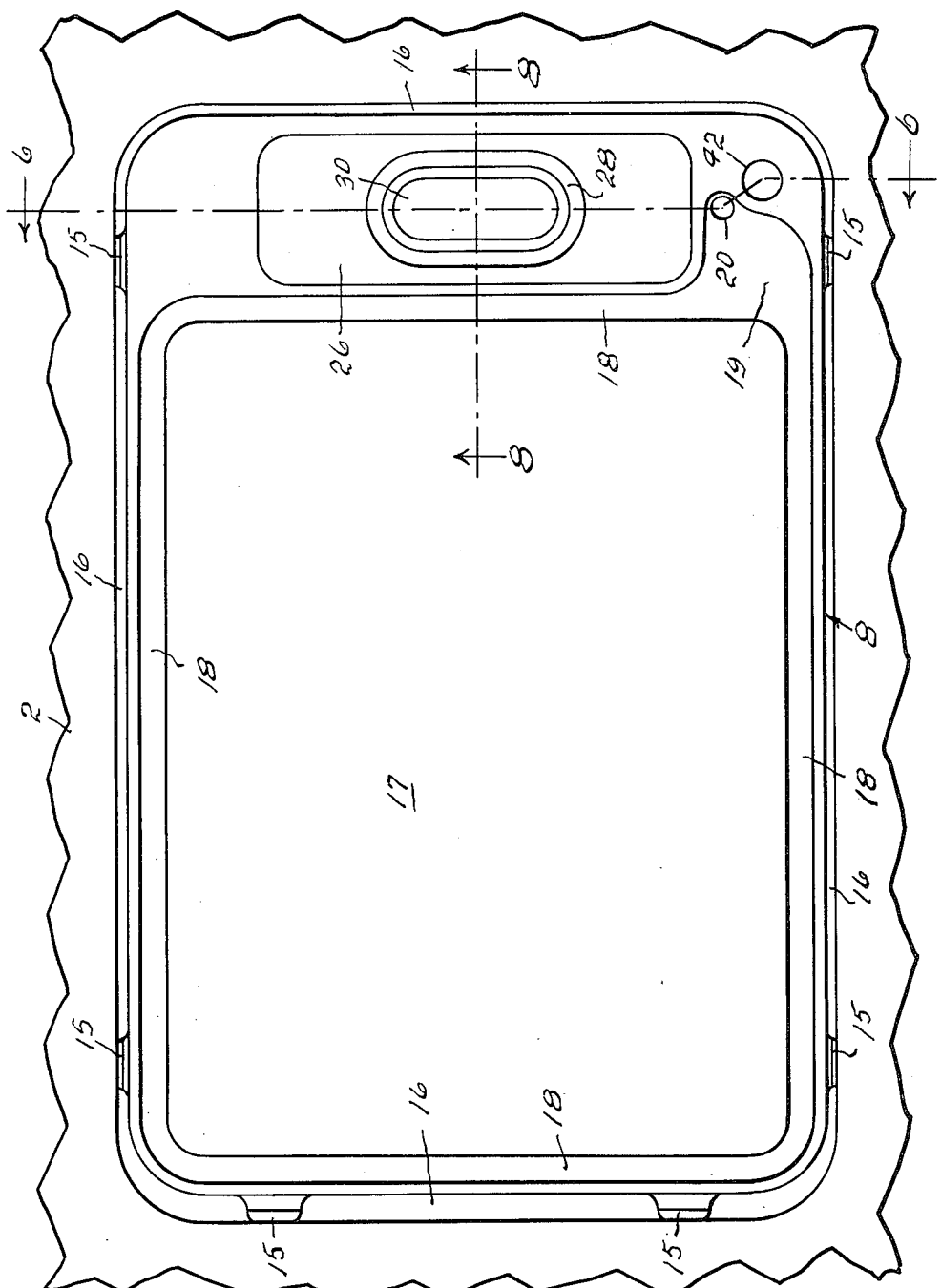

Oct. 16, 1956 W. C. KANZ 2,766,683
GRIDDLE
Filed May 17, 1954 5 Sheets-Sheet 3
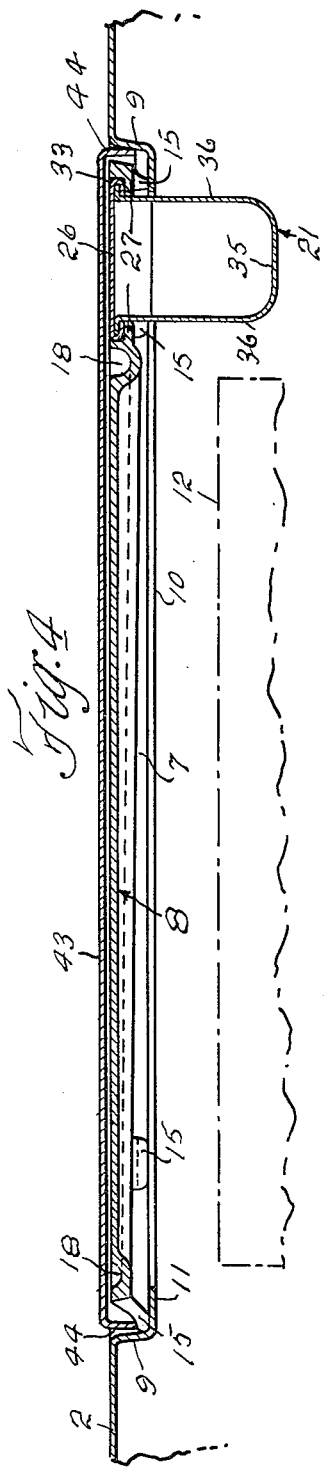
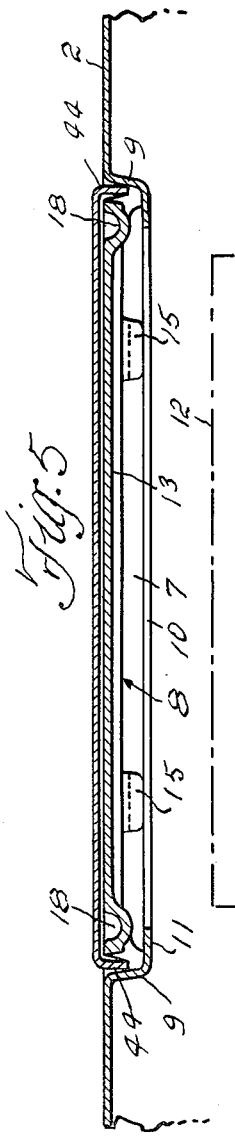
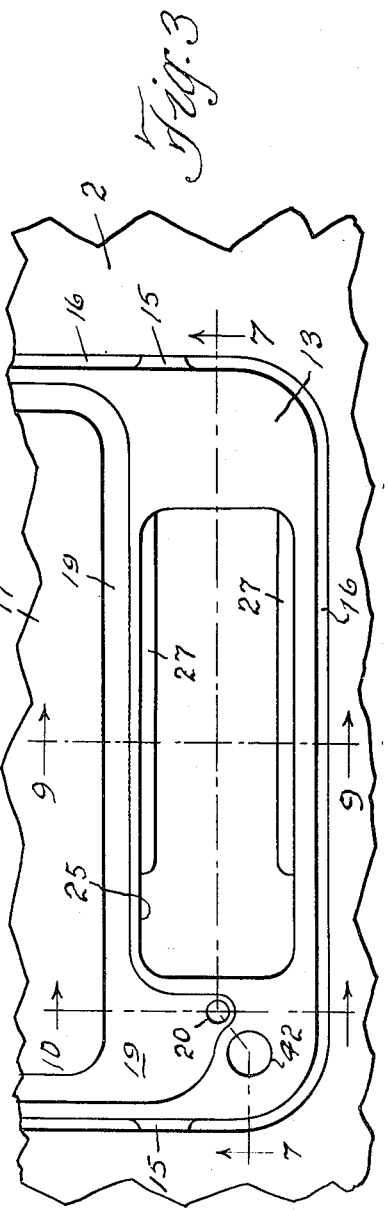
INVENTOR.
Wm. C. Kanz
BY Chas. H. Trotter
Atty.

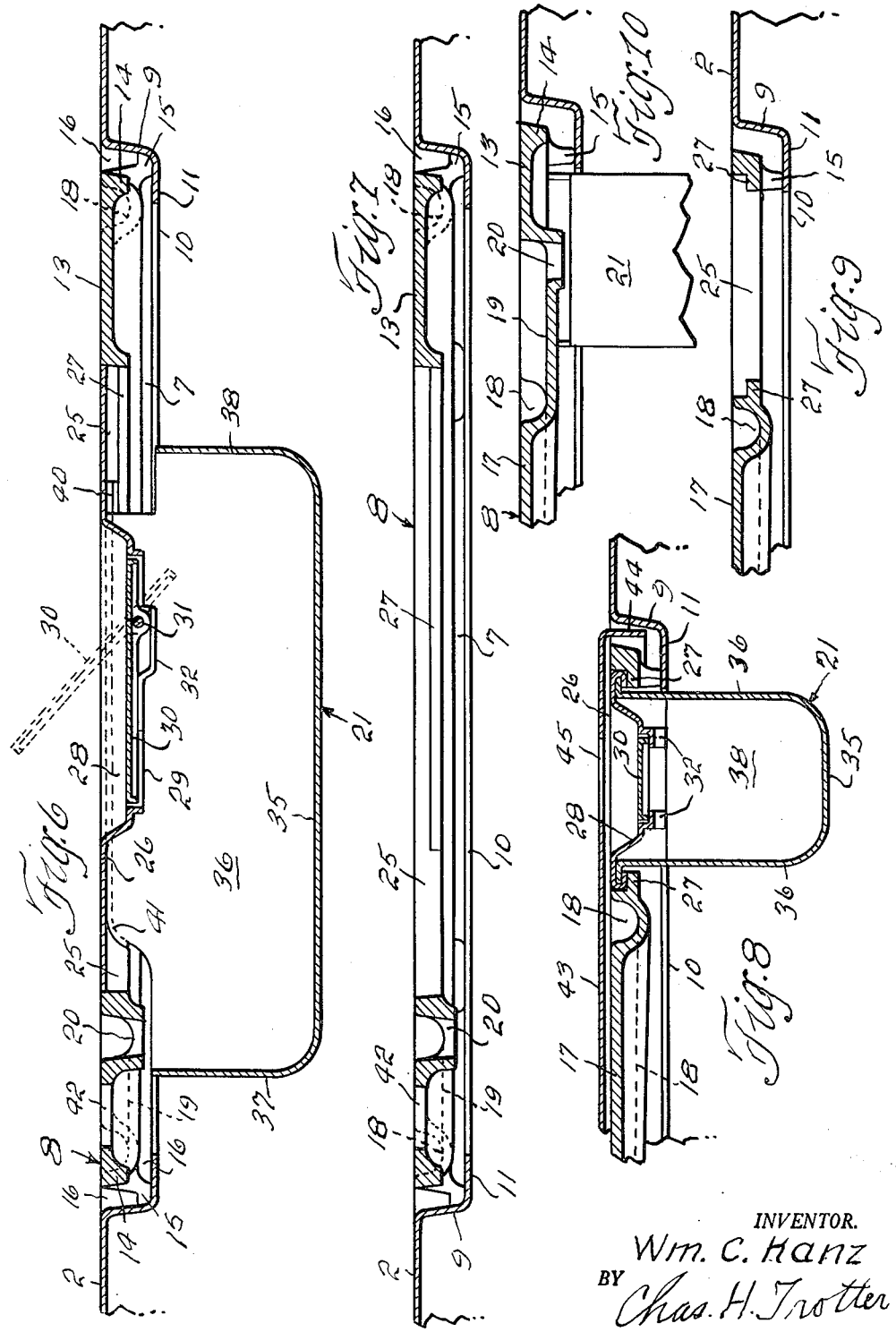

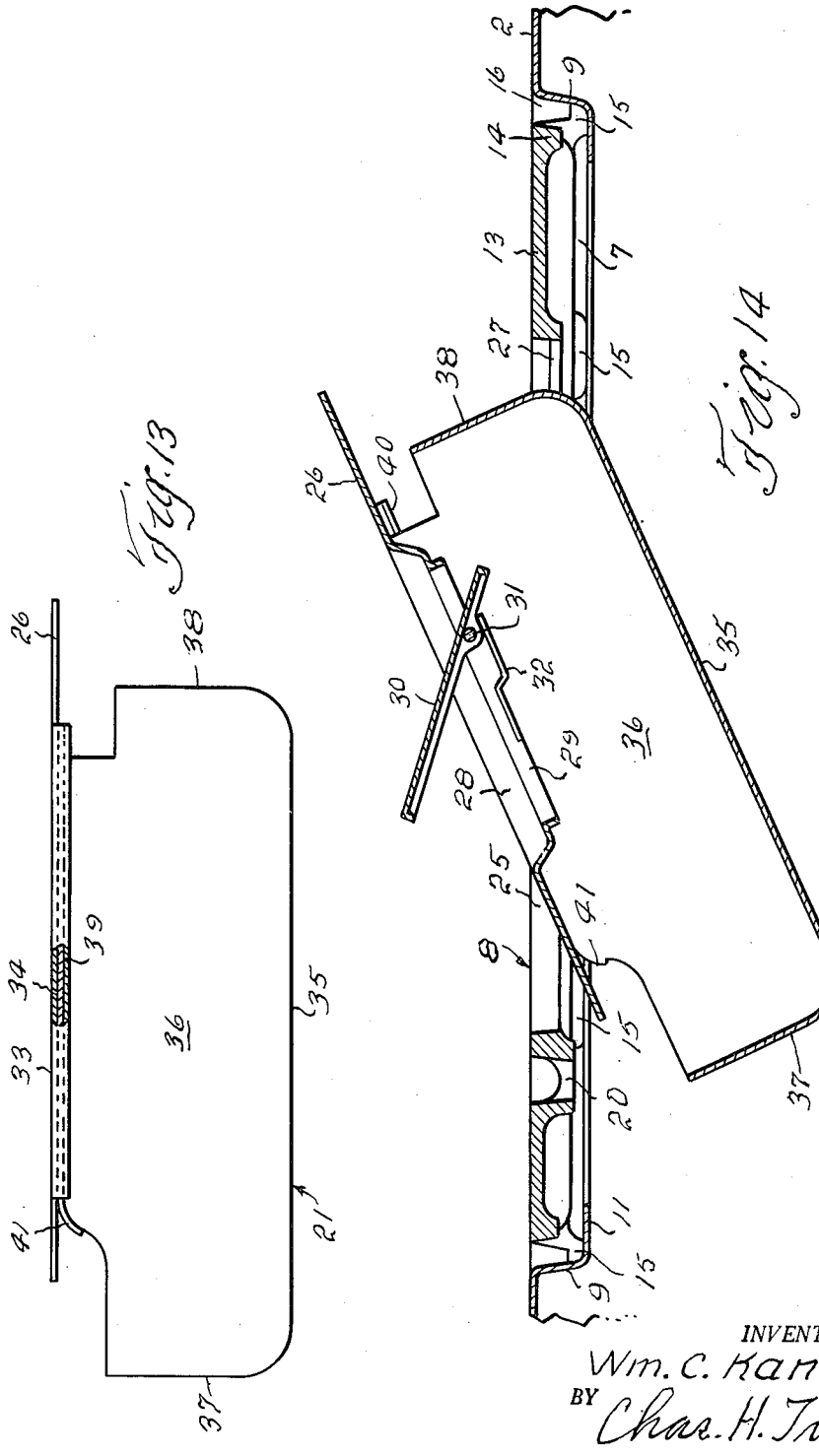

United States Patent Office 2,766,683
Patented Oct. 16, 1956

2,766,683

GRIDDLE

William C. Kanz, Mansfield, Ohio, assignor to The Tappan Stove Company, Mansfield, Ohio, a corporation of Ohio Application May 17, 1954, Serial No. 431,491

5 Claims. (Cl. 99—425)

This invention relates to a griddle which is incorporated in a cooking range as an element thereof.

In the past the general practice has been to provide griddles which were independent of a cooking range the same as any other cooking utensil. When used the griddle was placed over one or two of the top burners of a range, and when not in use it was stored remote from the range. This manner of using a griddle was very unsatisfactory in that it was impossible to evenly heat the griddle throughout the surface thereof, and consequently the best cooking results could not be obtained. Also after use the griddle had to be left on the stove a considerable time until it cooled because it was difficult to remove and store it while it was still very hot from use. Today most stove manufacturers are providing their better line of ranges with griddles which are incorporated therein as an element of the range. The griddles are provided with special burners therefor which are so constructed and arranged that they will heat the griddle uniformly throughout the surface thereof. When not in use the griddle remains in place in the range. Generally a removable cover is provided which is placed over the griddle when it is not in use.

I make no claim to the combination of a cooking range and a griddle incorporated therein as an element thereof, but claim only the construction per se of my griddle as shown and described herein. According to my invention I dispose the entire upper surface of the griddle in the same plane and I provide a rectangular gutter therein into which grease or other liquid used or generated during cooking will drain from the cooking surface. This gutter slopes downwardly from the rear to the front of the griddle and discharges into a sump at the front of the griddle adjacent one side thereof. The sump drains through a downspout therein into a receptacle which is disposed below the griddle at the forward end thereof under an enlarged rectangular opening in the griddle which is closed by a removable cover plate flush with the upper surface of the griddle. The receptacle is removably secured to the underside of the cover plate and is adapted to be withdrawn through the opening for emptying and cleaning by the removal of the cover plate. The griddle is mounted in a depressed section of the top of a range over an enlarged opening therein under which the griddle burner is mounted. The griddle is supported by a plurality of legs in spaced relation to the bottom and side walls of the depressed section so as to provide a narrow flue around the periphery of the griddle for the upward escape of gases generated by the griddle burner during use. When not in use the griddle is enclosed by a removable cover plate having a peripheral flange which extends down into the depressed section around the griddle.

The principal object of the invention is to provide an improved griddle which may be incorporated in a cooking range as an element thereof and which is so constructed that it may be readily removed from and replaced in a range.

Another object of the invention is to provide in a griddle of the aforesaid type improved means for collecting grease and other liquids used or generated during cooking and draining them into a receptacle provided for this purpose.

Another object of the invention is to so construct and mount the receptacle that it can be quickly and easily removed from the griddle for emptying and cleaning and then replaced.

Other and more limited objects of the invention will be apparent from the following specification and the accompanying drawings forming a part thereof wherein:

Fig. 2 is an enlarged top plan view of my improved griddle with the cover removed and showing it mounted in a recess in the range top;

Fig. 3 is a fragmentary top plan view of the front end of the griddle showing it with the receptacle removed therefrom;

Fig. 4 is an enlarged vertical section taken on the line 4—4 of Fig. 1;

Fig. 5 is an enlarged vertical section taken on the line 5—5 of Fig. 1;

Fig. 6 is an enlarged vertical section taken on the line 6—6 of Fig. 2;

Fig. 7 is an enlarged vertical section taken on the line 7—7 of Fig. 3;

Fig. 8 is an enlarged vertical section taken on the line 8—8 of Fig. 2;

Fig. 9 is an enlarged vertical section taken on the line 9—9 of Fig. 3;

Fig. 10 is an enlarged vertical section taken on the line 10—10 of Fig. 3;

Fig. 13 is a side elevation of the receptacle and cover removed from the griddle; and Fig. 14 is a view similar to Fig. 6 showing the manner of removing the receptacle from the griddle.

Figure 1:
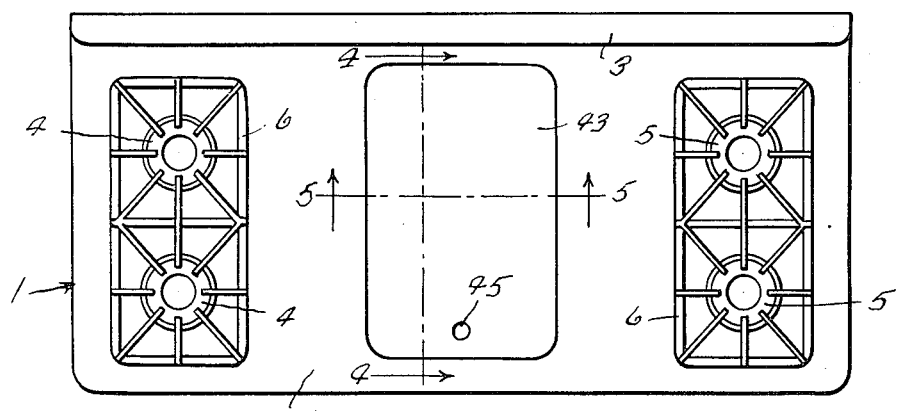
Fig. 1 is a plan view of a cooking range of the so-called divided top type showing my improved griddle incorporated therein between the two sets of aligned burners.
Figure 11:
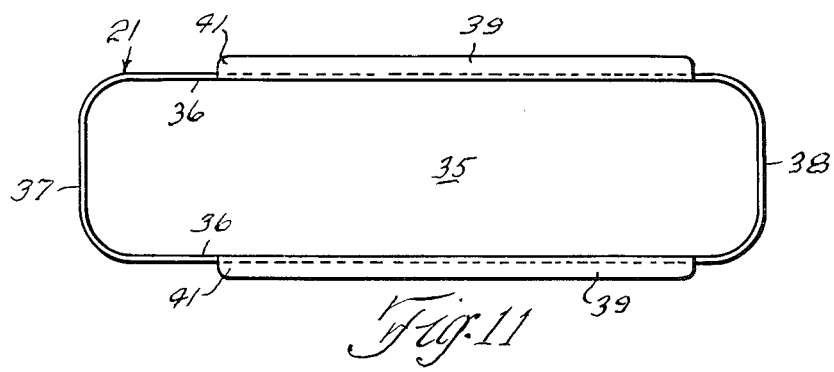
Fig. 11 is a top plan view of the receptacle.
Figure 12:
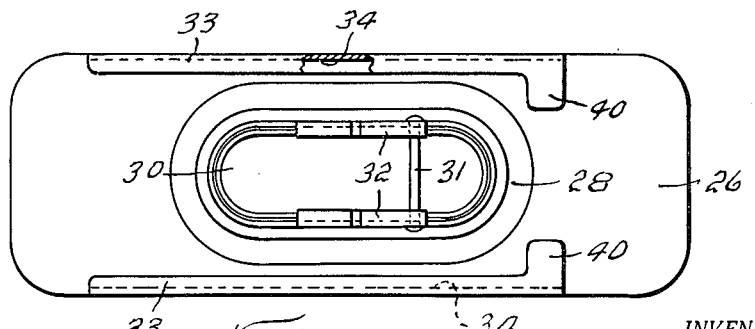
Fig. 12 is a bottom plan view of the cover plate on the under side of which the receptacle is removably mounted.

In the drawings Fig. 1 is approximately one-eighth (⅛) actual size; Figs. 2, 3, 4 and 5 approximately one-half (½) actual size, and the remaining figures, 6 to 14 inclusive, approximately three-fourths (¾) actual size.

Referring now to the drawings by reference characters the numeral 1 indicates a cook stove having a flat top 2 and the usual back splasher 3. A pair of aligned burners 4 are disposed adjacent one side of the range 1 and a pair of similar burners 5 are disposed adjacent the other side of the range. Utensil-supporting grates 6 overlie the burners 4 and 5. Between the burners 4 and 5 the top 2 is depressed to provide a shallow recess 7 in which the griddle generally indicated by the numeral 8 is mounted. The recess is bounded by a substantially vertical peripheral wall 9 and substantially the entire bottom of the recess is cut out to provide an enlarged opening 10 surrounded by a peripheral flange 11 which extends inwardly from the lower end of the peripheral wall 9. A burner 12, shown in dot and dash lines in Figs. 4 and 5, is suitably mounted below the opening 10 in position to heat the griddle 8 when in use.

The griddle 8 is cast from suitable metal with the entire upper surface thereof being disposed in the same plane and comprises a rectangular plate 13 having a downwardly extending peripheral flange 14 and a plurality of spaced legs 15 by which the griddle is supported on the flange 11 in spaced relation to the peripheral wall 9 and the flange 11 so as to provide a narrow flue 16 around the griddle through which gases generated by the burner 12 during use may escape.

The cooking section 17 of the plate 13 is surrounded by a depressed gutter or trough 18 which is formed in the plate 13 and slopes gradually downwardly from the rear of the griddle toward the front thereof and discharges into a sump 19 formed in the plate 13 at the front and to one side of the griddle. Grease or other liquid used or generated during cooking drains or is scraped from the cooking surface 17 into the gutter 18 and flows into the sump 19. The grease and/or liquid collected in the sump 19 is discharged therefrom through a downspout 20 into a receptacle 21 removably supported by and under the forward end of the plate 13.

The forward end of the plate 13 has an enlarged rectangular opening 25 therein which is normally closed by a complementary removable cover 26. The cover 26 is disposed within the opening 25 with the upper surface thereof flush with the top of the plate 13 and is supported by a pair of opposed ledges 27 along the sides of the opening 25. The cover 26 is formed with a centrally disposed depressed area 28 having an elongated opening 29 therein which is normally closed by a finger 30 which is rotatably mounted off center upon a pivot pin 31 carried by and between the side walls of the opening 29. Opposed stops 32 which extend inwardly from side walls of the opening 29 limit the opening and closing movements of the finger 30 as shown in Figs. 6 and 14. At each side thereof the cover 26 is turned downwardly and inwardly as indicated at 33 to provide a pair of opposed grooves 34.

The receptacle 21 is generally rectangular in shape and comprises the bottom 35, side walls 36 and the end walls 37 and 38. At the upper end thereof each side wall 36 is provided with an outwardly extending flange 39, which flanges are adapted to be inserted into the grooves 34 to removably secure the receptacle 21 to the cover 26. The end 37 of the receptacle is reduced in height to permit the receptacle to extend under the downspout 20 as shown in Fig. 6; and the end 38 thereof is reduced in height to provide clearance for the depressed section of the cover 26 as the cover is being applied to the receptacle. The sections 33 of the cover 26 are provided with stops 40 and one end of each of the flanges 39 is bent downwardly as shown at 41 to insure the proper positioning of the cover 26 on the receptacle 21. When the cover 26 and receptacle 21 are assembled together one end of the cover 26 extends out beyond the end 38 of the receptacle and the end 37 of the receptacle extends out beyond the other end of the cover as shown in Figs. 6, 13 and 14.

When it is desired to remove the receptacle from the griddle for emptying and cleaning the finger 30 is turned to the position shown in dotted lines in Fig. 6 after which it is grasped and the cover 26 and receptacle 21 removed from and through the opening 25 as shown in Fig. 14. A finger hole 42 is provided in the plate 13 in order that one may insert a finger therein and raise the forward end of the griddle when it is desired to remove the griddle from the range. A cover 43 having a downturned peripheral flange 44 is provided for the griddle when it is not in use. A finger hole 45 is provided in the cover 43 above the depression 28 in the cover 26 to facilitate the removal of the cover 43 from the griddle.

It is to be understood that I am not limited to the specific construction shown and described herein as various changes may be made therein within the scope of the appended claims.

What is claimed is:

1. A griddle of the character described which is adapted to be incorporated in a cooking range as a component part thereof and comprises a rectangular plate having a flat smooth cooking surface, a depressed gutter formed in said plate and surrounding said cooking surface, a sump formed in said plate and into which said gutter discharges, an enlarged opening in said plate adjacent the forward end thereof, a removable cover for said opening, a receptacle removably secured to the underside of said cover, said receptacle being adapted to be removed through said opening by the removal of said cover from said opening, and a downspout through which said sump discharges into said receptacle.

2. A griddle as defined in claim 1 in which said cover has an elongated opening therein which is normally closed by a pivoted finger.

3. A griddle as defined in claim 2 in which said finger is pivoted off center and means is provided to limit the opening movement of said finger.

4. A griddle as defined in claim 1 in which said cover is formed with a depressed area having an elongated opening therein which is normally closed by a pivoted finger.

5. A griddle as defined in claim 4 in which said finger is pivoted off center and means is provided to limit the opening movement of said finger.

References Cited in the file of this patent

UNITED STATES PATENTS

| | | |
|---|---|---|
| 1,542,867 | Fisher | June 23, 1925 |
| 2,046,973 | Schroeder | July 7, 1936 |
| 2,157,303 | Penrose et al. | May 9, 1939 |
| 2,362,757 | Lang | Nov. 14, 1944 |
| 2,367,626 | Shroyer et al. | Jan. 16, 1945 |